Patented Oct. 17, 1950

2,526,118

UNITED STATES PATENT OFFICE 2,526,118

PHENOTHIAZINES

Paul Charpentier, Choisy-le-Roi, France, assignor to Societe des Usines Chimiques, Rhone-Poulenc, Paris, France, a French corporation No Drawing. Application September 21, 1948, Serial No. 50,447. In France April 6, 1948

4 Claims. (Cl. 260—243)

In U. S. application No. 650,747, now Patent No. 2,519,886, which relates to the preparation of N-dialkylaminoalkylphenothiazines, it was indicated that these substances have a marked anti-dyspnoeic and anti-histaminic activity, and in U. S. application No. 788,649, which is a continuation-in-part of application No. 650,747, mention is made of the anti-histaminic activity of other substances belonging to the same chemical group.

It has now been found that N-(2'-diethylamino-2'-methylethyl)-phenothiazine and, to a lesser extent, its 1' methylated isomer, which though not specifically described in the aforesaid U. S. application nevertheless fall within the general formulae therein set forth, have a remarkably favourable action in the treatment of Parkinson's disease.

According to the present invention, N-(2'-diethylamino-2'-methylethyl)-phenothiazine, as well as its isomer N-(2'-diethylamino-1'-methylethyl)-phenothiazine, are obtained by reacting phenothiazine with a diethylamino halogen propane in which the diethylamino substituent and the halogen substituent are on adjacent carbon atoms in the presence of an acceptor for hydrohalic acid. Whatever the isomer employed (i. e., either the 2-dialkylamino-1-halopropane or 1-dialkylamino-2-halopropane), during the course of the reaction a transposition is effected which has the effect of simultaneously producing the two isomeric products, with predominance of the 2' methylated isomer. The two isomers may be separated by conversion of the bases into hydrochlorides, fractional crystallisation of alcohol solutions of the hydrochlorides, and liberation of the bases by the action of a caustic alkali.

The invention is illustrated by the following examples which are not to be regarded as limiting the invention in any way:

Example I 30 grs. of phenothiazine, 120 grs. of xylene, and 7 grs. of sodium amide (85%) are mixed and heated under reflux. A solution of 28 g. of 1-diethylamino-2-chloropropane in 28 g. of xylene is added gradually over 1 hour, the mixture being kept boiling. Reflux heating is continued for about 1 hour more. After cooling, the mixture is dissolved in 400 ccs. of water and made acid (to Congo red) by the addition of hydrochloric acid. The xylene is decanted and the aqueous layer is made strongly alkaline by the addition of caustic soda. The desired base is then separated, extracted with ether and distilled, the fraction which distils at 203–205° C. at 2 mm. pressure being collected.

In the course of the reaction isomerisation occurs and a mixture of N-(2'-diethylamino-2'-methylethyl)-phenothiazine and N-(2'-diethylamino-1'-methylethyl)-phenothiazine is obtained. These isomers are separated by converting them to the hydrochlorides by the action of dry hydrochloric acid on a solution of the bases in acetone or ethyl acetate, and recrystallisation of the hydrochlorides from alcohol solution.

The hydrochloride of N-(2'-diethylamino-2'-methyl-ethyl)-phenothiazine crystallises first. It melts at 211° C. The corresponding picrate melts at 148–149° C., and the iodomethylate at 238–239° C.

From the mother liquors of the crystallisation the hydrochloride of the isomeric product N-(2'-diethylamino - 1' - methylethyl) - phenothiazine which melts at 162° C. is recovered. The corresponding picrate melts at 142-143° C., and the iodomethylate at 221° C.

Example II

By operating in the same manner, but starting with 28 g. of 2-diethylamino-1-chloropropane instead of 1-diethylamino-2-chloropropane, the hydrochloride of N-2'-diethylamino-2'-methylethyl)-phenothiazine, already described in the preceding example, is obtained.

I claim:

1. The new compounds of the class consisting of N-(2'-diethylamino-2'-methylethyl)-phenothiazine and its salts.

2. Process for the preparation of N-(2'-diethylamino - 2' - methylethyl) - phenothiazine which comprises reacting phenothiazine in the presence of sodamide with a diethylaminohalopropane wherein the diethylamino substituent and halogen substituent are attached to two adjacent carbon atoms and separating N-(2'-diethylamino-2'-methylethyl)-phenothiazine from the isomeric products obtained.

3. Process for the preparation of N-(2'-diethylamino - 2' - methylethyl) - phenothiazine which comprises reacting phenothiazine with a 1-diethylamino 2-halopropane in the presence of sodamide and separating N-(2'-diethylamino-2'-methylethyl)-phenothiazine from the isomeric products obtained.

4. Process for the preparation of N-(2'-diethylamino - 2' - methylethyl) - phenothiazine which comprises reacting phenothiazine with 2-diethylamino-1-halopropane in the presence of sodamide and separating N-(2'-diethylamino-2'-methylethyl)-phenothiazine from the isomeric products obtained.

PAUL CHARPENTIER.

REFERENCES CITED

The following references are of record in the file of this patent:

UNITED STATES PATENTS

| Number | Name | Date |
|---|---|---|
| 2,295,504 | Shelton | Sept. 8, 1942 |
| 2,406,594 | Djerassi et al. | Aug. 27, 1946 |
| 2,439,749 | Niederl et al. | Apr. 13, 1948 |

FOREIGN PATENTS

| Number | Country | Date |
|---|---|---|
| 518,207 | Germany | Feb. 9, 1931 |

OTHER REFERENCES

Gilman et al., Jour. Amer. Chem. Soc., vol. 66 (1944), pp. 888–892.

Halpern et al., Comp. Rendu Soc. Biologie, vol. 115 (1946), pp. 361-365.

Wiselogle, Survey of Antimalarials, 1941–1945 (1946), vol. II, part 1, pp. 699–700. [Survey Nos. 625, 626, 627 and 629 (Oct. 29, 1942) and 1843 and 1844 (Mar. 9, 1943).]